Jan. 23, 1968  F. P. VALENZIANO  3,364,939
METHOD OF TAPPING PRESTRESSED PIPES
Filed June 30, 1965  3 Sheets-Sheet 1

INVENTOR.
FRANK P. VALENZIANO
BY
George F. Des Marais
ATTORNEY

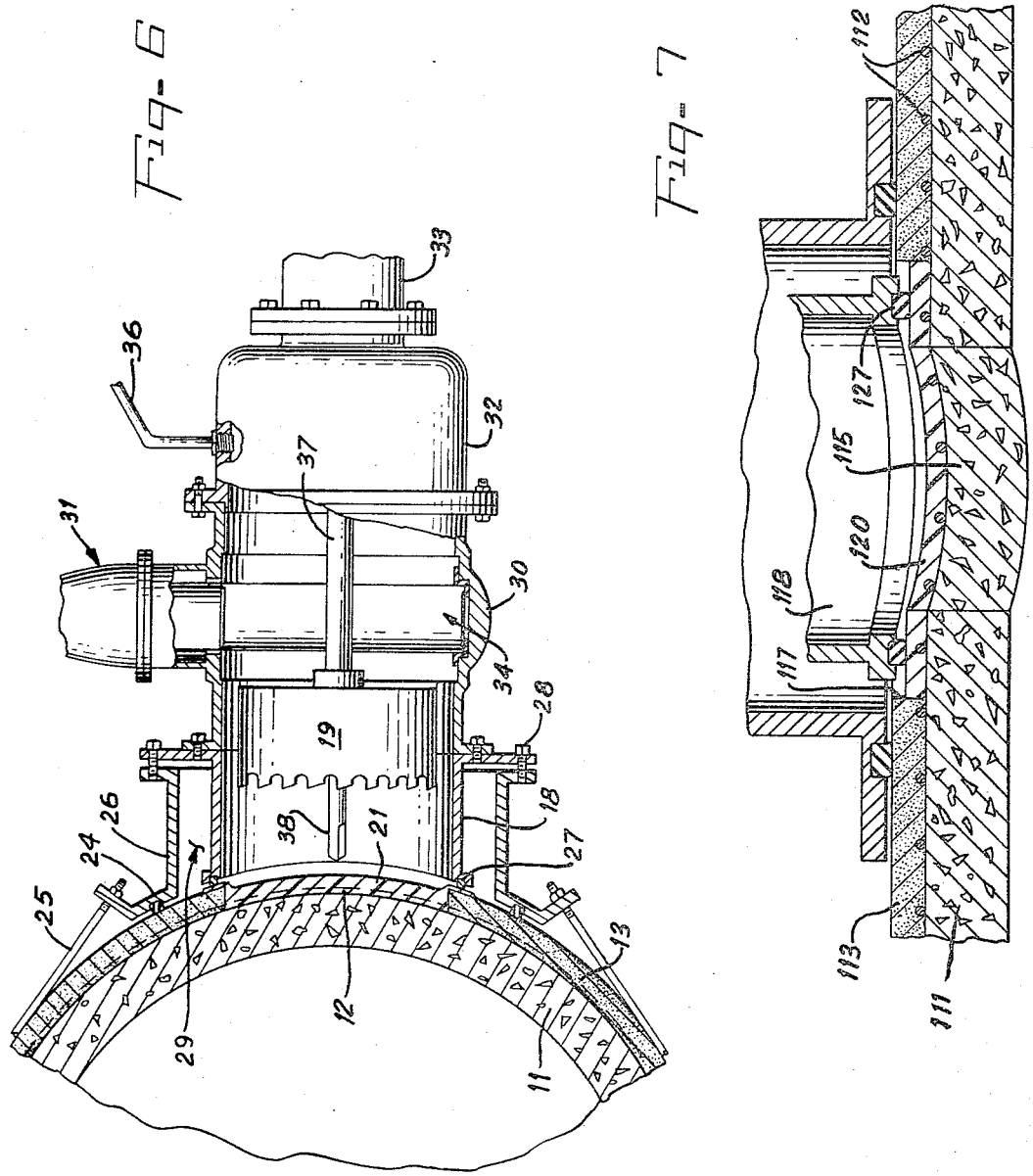

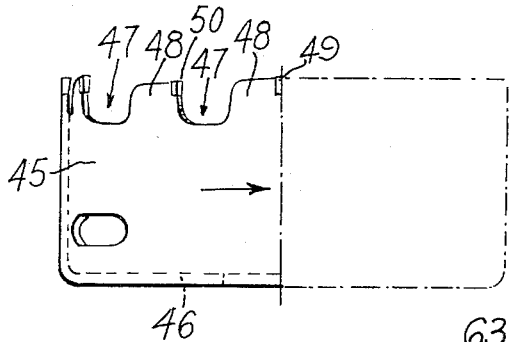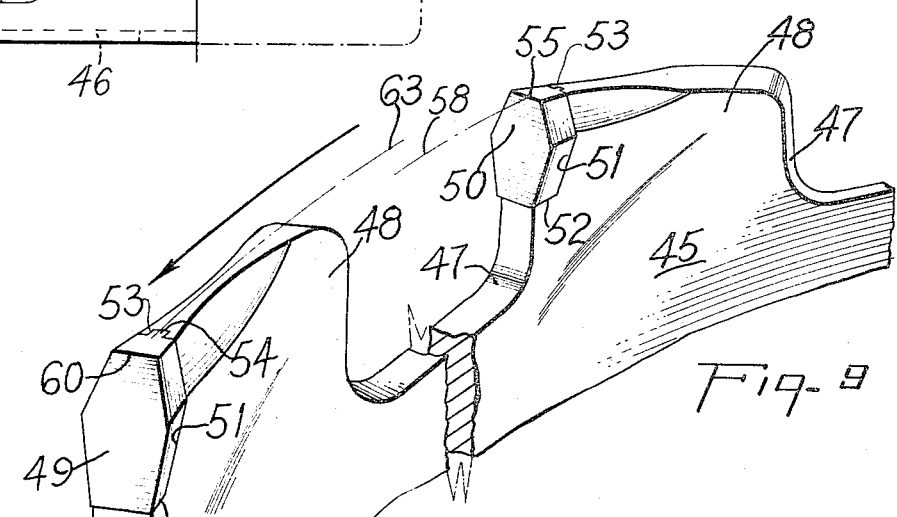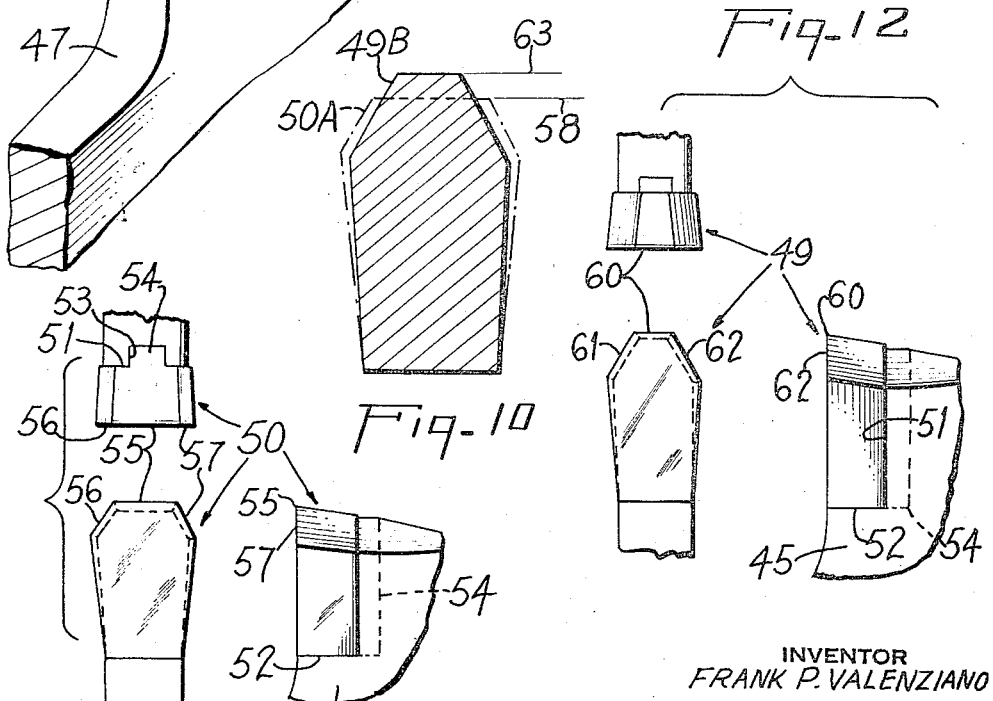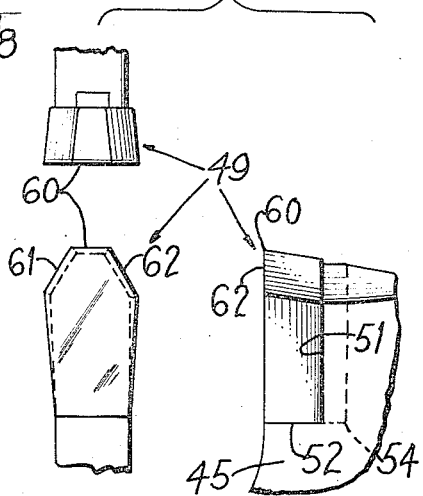

United States Patent Office 3,364,939
Patented Jan. 23, 1968

3,364,939
METHOD OF TAPPING PRESTRESSED PIPES
Frank P. Valenziano, Summit, N.J., assignor to International Pipe and Ceramics Corporation, East Orange, N.J., a corporation of Delaware
Filed June 30, 1965, Ser. No. 468,302
7 Claims. (Cl. 137—15)

ABSTRACT OF THE DISCLOSURE

A portion of the protective coating on the tubular core of a prestressed concrete pipe is removed from the core to provide an opening in the coating to lay bare an area of the outer surface of the core and segments of the coils of tensioned wire wound around the core. The portion of the protective coating removed is replaced with a layer of hardenable plastic material which, upon hardening, is bonded to the coil segments, the outer surface of the core within the opening and the protective coating at the edge of the opening. The pipe is then tapped by cutting through the hardened plastic material layer, the wire coils and the pipe core on a perimeter located inward from the edge of the opening initially made in the protective coating. According to another procedure, hardenable plastic material may be extended onto the exterior surface of the protective coating to form a membrane continuous with the layer of plastic material in said opening.

---

This invention relates to methods of tapping a prestressed concrete pipe in a pipe line operating under pressure.

A prestressed concrete pipe consists essentially of a tubular body, a wrapping of tensioned wire around the tubular body and attached thereto at the pipe ends, and a hard mortar coating covering the wire wrapping. The tensioned wire wrapping operates to strain the tubular body in compression and to maintain compressive strain under operating conditions for which the pipe is designed. The strained tubular body constitutes the water barrier of the wall of the pipe.

For making a branch connection to such a pipe it is necessary to cut some of the coils of the tensioned wire wrapping in the region of a proposed tap. In doing this the circumferential compressive strain in that portion of the tubular body which is encircled or bound by the coils required to be cut will diminish upon the severing of the wire wrapping unless some means is present for assuming the function of the cut coils. Loss of strain should be avoided lest the watertightness of the pipe be impaired.

Another problem which is present is concerned with the requirement for a watertight joint between a branch connection and a tapped pipe. Any method for tapping a prestressed pipe must provide for avoiding injury to the pipe and at the same time provide for obtaining a watertight seal at the tap.

There are two principal types of prestressed concrete pipes which are commonly used in pipe lines distributing water under pressure. In one of these the tubular body consists of a steel cylinder and a concrete tube or lining inside of the cylinder. The tensioned wire wrapping is applied onto the outside of the steel cylinder. A pipe of this type is known as "prestressed concrete cylinder pressure pipe." Reference may be had to the United States Patent No. 2,375,921 for a more detailed description of this type of pipe. In a different type of prestressed concrete pipe, the tubular body consists only of a concrete tube or hollow core with the tensioned wire wrapping bearing directly on the exterior of the tube. This latter type is known as a "prestressed concrete noncylinder pressure pipe." Example of this type of pipe are described in the United States Patents Nos. 3,034,536 and 3,183,011.

Methods and apparatus for tapping "prestressed concrete cylinder pressure pipe" are disclosed in the United States Patents Nos. 2,050,985 and 2,684,859. The tapping equipment therein described includes a saddle which is mountable on a pipe at the location where a tap is to be made. The saddle supports a sealing gland which establishes a watertight connection around a tap at the jointure between a branch pipe and a tapped pipe. The tapping equipment also includes a valve to which a tapping machine may be temporarily attached for the purpose of cutting through the wall of a pipe.

In a "prestressed concrete cylinder pressure pipe," the steel cylinder serves as a membrane preventing seepage of water through the wall of the pipe. In order to assure a watertight joint between the pipe and a branch connection, the sealing gland which is carried by the saddle is made to bear against the steel cylinder to effect a seal. Before the gland can be placed in sealing position, it is necessary to remove an area of the mortar coating and cut segments of wires from the coils of the wire wrapping which extend across the boundary of the area which is subsequently to be sealed by the gland. When the wire wrapping is cut the circumferential compressive strain in the tubular body reduces in the vicinity of the cut coils; also, cracking may occur in the protective mortar coating at the edge of an opening as a result of relaxation of tension in the cut coils. Internal water pressure can crack a concrete tube or lining where it is not constrained circumferentially and might even cause a relatively thin steel cylinder of a prestressed concrete cylinder pressure pipe to bulge or blow out on the cutting of the wire wrapping if the proposed tap is large and the water pressure is high enough to bring about such a result.

The making of a tap in a prestressed concrete noncylinder pressure pipe is attended with greater difficulty because of the absence of a steel cylinder and the fact that the concrete tube is not sufficiently strong in istelf to resist the water pressure which the pipe is designed to contain. Since the concrete tube constitutes the water barrier of the pipe wall, cracking of the tube cannot be tolerated.

Among the objects of the present invention is to improve upon procedures theretofore practiced for tapping prestressed concrete pipes.

Another object is to provide a novel method for tapping a prestressed concrete pipe without developing conditions which are likely to cause the concrete tube of the pipe to crack.

Another object is to suppress loss of tension in the coils of a wire wrapping which are required to be cut in the making of a tap.

Another object is to provide a method of preventing leakage through cracks in the protective mortar coating of a prestressed concrete pipe should they develop in the course of preparing the pipe for tapping, or occur as a result of a tapping operation.

Another object is to provide means for efficiently cutting through anchored coils of a highly tensioned wire wrapping of a high carbon, high tensile strength steel.

According to the invention, an opening is first formed in the protective mortar coating of a pipe at the location of an intended tap by removing from the coating an area of the coating having a perimeter greater than the perimeter of the intended tap and thereby exposing segmental portions of coils of the tensioned wire wrapping which extend across the opening formed in the coating. The coating area is removed down to the outside surface of the tubular body of the pipe.

The area of the opening made in the mortar coating may be a generally circular area having a diameter greater than the diameter of the intended tap but less than the diameter of the sealing gland of the tapping equipment which is to be employed, or, alternatively, the opened area may be large enough to extend to the outside of the sealing gland of the tapping equipment which is to be employed, as will appear more fully hereinafter.

The exposed surface of the tubular body, the exposed portion of the wire wrapping and the rim of the protective coating of mortar, at and adjacent the opening in the coating, are then covered with an adhesive waterproof plastic material which is hardenable into an impermeable coating in bonded relationship to the covered surfaces.

The coating formed within and about the opening is herein called an auxiliary coating in order to distinguish it from the mortar coating which is ordinarily used for protecting the wire wrapping of prestressed concrete pipes. The auxiliary coating may comprise any hardenable plastic material of various compositions containing resins, such as epoxy resins, phenolic epoxy resins and polyester resins. The coating material can be applied in one or more steps. After the auxiliary coating has hardened, a space is sealed-off to the outside of the auxiliary coating to form a fluidtight chamber over the region of the proposed tap. This is accomplished by utilizing the sealing gland and the housing portion of a tapping equipment. The fluidtight chamber enables the outside of the tapping region to be subjected to pressure substantially equal to the pressure in the pipe.

The tap is accomplished by advancing a rotating shell cutter from within the chamber. The cut is made on a circle located inwardly from the perimeter of the opening which was previously prepared in the mortar coating of the pipe so as to leave undisturbed and intact that part of the auxiliary coating which surrounds the tap, namely, that part which covers the edge of the mortar coating, the circular area of the outside surface of the tubular body located between the edge of the mortar and the tapped hole, and the portions of cut coils extending between the edge of the mortar and the hole cut through the tubular body. Owing to the strength of the auxiliary coating and its bond to the engaged elements, relaxation of the tension in the cut coils is resisted. In addition to functioning as a watertight membrane which prevents access of water to the mortar coating, the auxiliary coating affords a smooth bearing surface for the sealing gland of the tapping equipment.

Upon completing the tap, the cutter and the coupon which is severed by the cutter are withdrawn beyond a valve and the valve is closed in order to enable recovery of the coupon and the replacement of the cutting machine by a branch pipe in accordance with usual tapping procedures.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing, in which:

FIG. 6 is a cross-sectional view of a pipe and showing a tapping assembly or equipment attached to the pipe exteriorly of the tapping region;

FIG. 7 is a sectional view longitudinally of a pipe and illustrating an alternative manner of practicing the invention;

FIG. 8 is an elevational view of a shell cutter;

FIG. 9 is an enlarged perspective view of a portion of the cylindrical wall of the cutter shown in FIG. 8;

FIG. 10 is a diagrammatic illustration of the relative proportions of the front faces and cutting edges of the two cutting teeth shown in FIG. 9;

FIG. 11 illustrates one of the cutting teeth in views from three directions;

FIG. 12 illustrates another of the cutting teeth in views from three directions.

The method of the present invention is particularly useful for tapping a prestressed concrete pipe while under operating pressure, but it provides advantages in connection with the tapping of any type of wire wound prestressed pipe, and also whether or not the pipe to be tapped is a section of a pipe line operating under pressure at the time the tap is made.

Figure 5:
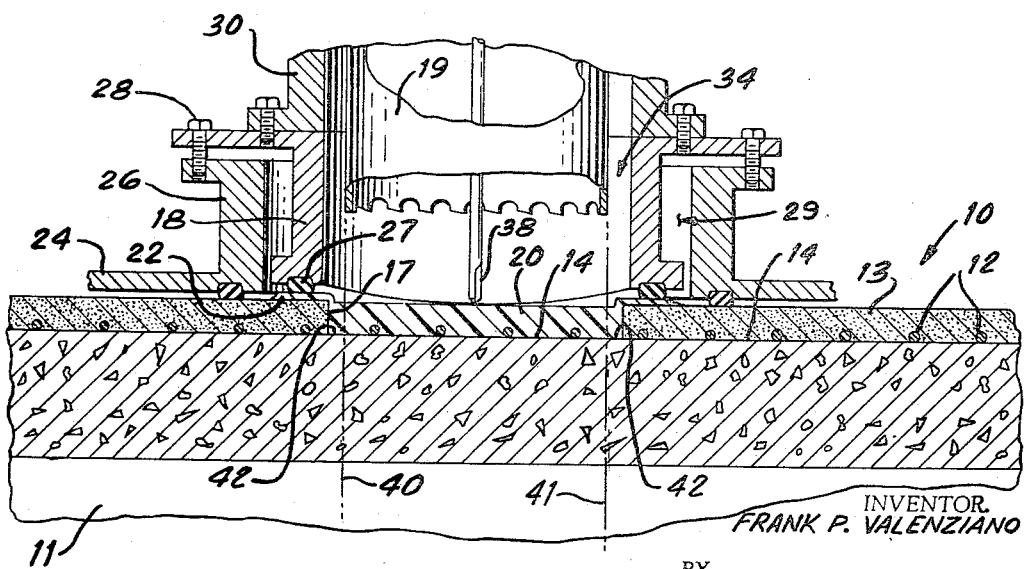
FIG. 5 is a longitudinal section through the center of the region of the tap along line 5—5 in FIG. 4.

In the interest of clearness the method will be described with reference to a prestressed concrete non-cylinder pressure pipe. The part of the pipe 10 shown in section in FIG. 5 is that of the wall of a pipe in which a concrete tube 11 is strained in compression by a helical wrapping of tensioned wire 12. The wire customarily used in prestressed pipe is a hard-drawn high tensile strength steel wire having a tensile strength of the order of 200,000 pounds per square inch and upwards, as is well understood in the art. The wire wrapping is protected by a Portland cement mortar coating 13 covering the exterior surface 14 of the tube 11.

Figure 1:
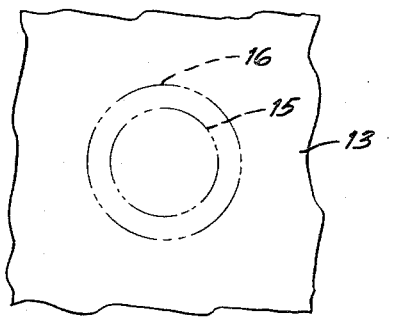
FIG. 1 is illustrative of a region on the outside of a pipe where a tap is to be made.
Figure 2:
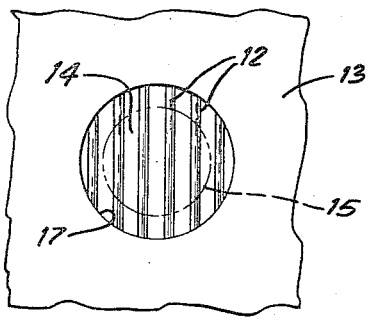
FIG. 2 illustrates the tapping region after a portion of the mortar coating has been removed.

In FIG. 1, the circle 15 indicates the location of the periphery of a proposed tap through the wall of a pipe and the circle 16 represents the boundary 17, FIG. 2, of an opening which is to be formed in the mortar coating 13. It is to be understood, however, that it is not necessary that the opening in the mortar coating be circular for all applications of the method of the present invention. The opening is made by removing the portion of the coating 13 which is within a preselected area, as exemplified by the circle 16, down to the exterior surface 14 of the concrete tube, FIGS. 2 and 5. The removed area of the pipe coating may be manually chipped out or removed in any manner desired.

In one application of the invention the opening in the mortar coating is made generally circular as shown in FIG. 2 and of such size as to locate the edge 17 of the mortar coating to the inside of the sealing gland of a tapping assembly and to the outside of the margin 15 of the proposed tap so that a tapping assembly may be mounted in the manner shown in FIG. 5 with its gland 18 in sealing position over the mortar coating and with the cutting edge of the shell cutter 19 located radially inwardly from the edge of the mortar coating. In this arrangement, the sealing gland bears against a membrane portion of an auxiliary coating. If the sealing gland is to be located to the inside of the opening in the mortar coating as demonstrated in the arrangement shown in FIG. 7, the opening may be elliptical or rectangular with its long axis extending laterally of the pipe.

The material for forming an auxiliary coating is placed after the mortar coating has been removed from the portions of wire extending across the opening, and the concrete surface 14 has been cleaned. The auxiliary coating 20 comprises a hardened coherent mass of originally plastic material which may include any of a number of liquid settable materials, including the thermosetting resins hereinabove mentioned, and an inert filling, such as silica. I have obtained the results desired with a mixture comprising liquid epoxy resin, liquid polyamine catalyst, liquid polysulfide flexiblizer and silica. A suitable coating material is obtainable from the International Pipe and Ceramics Corporation under the name of "Duralox 15."

Figure 3:
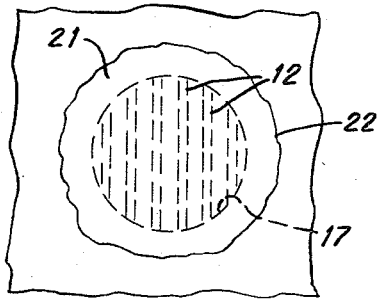
FIG. 3 illustrates the tapping region covered with sealing material.

When the sealing gland of the tapping equipment is to be applied over the mortar coating, as illustrated in FIG. 5, it is preferable to apply the coating material in two steps. As schematically illustrated in FIG. 3, a priming coat of the liquid ingredients of the material employed for forming the auxiliary coating is applied to form a film 21. Depending on its consistency, the liquid material is brushed or sprayed to form a continuous layer extending beyond the opening 17, as indicated at 22. It is important that the expanse of the film be sufficiently great to provide a bearing surface for engagement by the sealing gland of a branch connection as hereinabove explained with reference to FIG. 5, and a water-tight membrane. The membrane formed upon hardening is more extensible than concrete and seals any cracks that might develop in the mortar coating.

Figure 4:
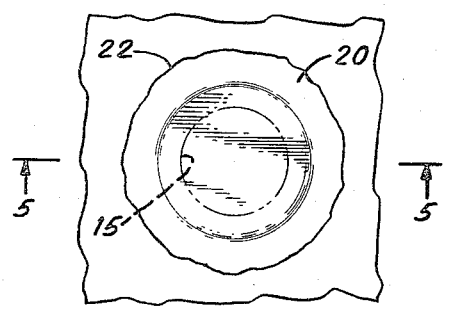
FIG. 4 illustrates the tapping region covered with an auxiliary coating.

Additionally coating material having the consistency of mortar and consisting of a mixture of the liquids employed for forming the film and of finely divided inert material such as silica is then trowelled over the portion of the film covering the surface 14 of the concrete tube, FIG. 4. While the coating material covering the original mortar coating need be only sufficiently thick to provide a watertight membrane, the material within the opening 17 should be thick enough to encase the wire 12 (FIG. 5) and firmly fix the coils of the wire in place during a cutting operation. The auxiliary coating is then cured to a hardened condition by the application of heat or by natural processes.

When the auxiliary coating material is applied in two or more steps, the resins employed in the different steps should be so constituted as to be cross-linkable, or at least compatible so that the hardened auxiliary coating will be constituted in a solid coherent mass in bonded relationship to the wires and concrete surfaces.

After the auxiliary coating has hardened, the pipe is ready for tapping. Any tapping equipment may be used which is adaptable for forming a fluidtight chamber to the exterior of the tapping region.

Referring to FIGS. 5 and 6, a saddle 24 is attached to the pipe by straps 25 with the neck 26 of the saddle concentrically located with respect to the center of the proposed tap. A gasket 27 on the gland 18 is pressed against the auxiliary coating layer 22 covering the mortar coating by tightening the bolts 28. When the gland has been secured, the space 29 is filled with grout. The casing 30 of a valve 31 and the casing 32 of an adapter for a tapping machine 33, together with the gland 18, constitute a housing enclosing a fluidtight chamber 34.

The chamber 34 is adapted to be subjected to pressure by the application of fluid under pressure through a conduit 36 which is tapped into the housing of the chamber at a convenient location, as shown in FIG. 6.

The cutting machine includes a shaft 37 to which is attached a shell cutter 19 and a centering drill 38. The maximum diameter of the shell cutter is equal to the diameter of the proposed tap 15. This diameter is the distance between the dotted lines 40 and 41 in FIG. 5. In cutting a circular kerf through the auxiliary coating 20, certain of the coils of the wire winding 12 which are in the path of the cutter are severed, leaving segments of wire bonded in place within the coupon which is cut from the pipe wall. When a pipe in a pipe line operating under pressure is to be tapped, the enclosed chamber 34 is pressurized so as to avoid tensile strains in the wall of the pipe which might develop from the severing of the wire wrapping as the cutting proceeds through the auxiliary coating. If desired, or if an external supply of fluid under pressure is not available, the pressure within the chamber may be equalized to that within a pipe under pressure by piercing the pipe wall with the centering drill 38 of the shell cutter.

As demonstrated in FIG. 1 by the relative sizes of the circles 15 and 16, the diameter of the opening in the original pipe coating was predetermined so as to leave on the pipe after the tap is completed an annular area of the auxiliary coating between the periphery of the tap and the outer edge 22 of the auxiliary coating. The ring of the auxiliary coating 20 remaining on the pipe provides a watertight barrier between the concrete surface at 42 and the sealing gasket 27.

According to an alternative procedure, tapping equipment is utilized in the manner illustrated in FIG. 7. For accomplishing this, the opening in the original pipe coating 113 is made larger than an area which can be sealed by a sealing gland 118 so that the gasket 127 of the sealing gland can be made to bear upon a hardened auxiliary coating 120 at a substantial distance inwardly from the edge 117 of the opening in the mortar coating instead of over a sealing film on the mortar coating as demonstrated in the arrangement shown in FIG. 5. The length of the opening and the length of the auxiliary coating 120 in the circumferential direction of the pipe can be equal to or greater than their axial dimension.

The coating material is applied to cover the edge 117 and the entire area of the exposed outer surface of the concrete tube 111. If desired, the coating material may be applied directly to the surfaces to be covered from a batch of the material and trowelled into the opening provided in the mortar coating. It is not essential that a plastic membrane be formed over the outside surface of the mortar coating.

It is evident that by providing an extensive auxiliary coating area the lengths of the coils of the wire wrapping 112 which are encased by the coating are considerably longer than when the perimeter of the coating is closer to the hole to be tapped. The long circumferential lengths of wire between the perimeter of the auxiliary coating 120 and the tap 115 provide increased bonding surface area for each cut coil. In this manner the alleviation of loss in prestressing when the wire wrapping is cut is further augmented. Moreover, the force exerted on the gland is brought to bear upon end portions of the cut coils of the wire winding adjacent the tap. Except in particular features referred to, the method of tapping is similar to the method hereinbefore described.

The wire used in a tensioned wire wrapping of a prestressed concrete pipe is a hard-drawn-steel spring wire, A.S.T.M. designation A–227. A suitable shell cutter for cutting such a wire is illustrated in FIGS. 8–12. The cutter has a substantially cylindrical wall 45 and a transverse wall 46 to which the cutter is attached to a drive shaft, such as the shaft 37, FIG. 6. The circular open edge of the shell is notched to provide a notch 47 between successive projections 48, with the projection and notches alternating around the circumference of the edge.

Tool tips of cutting teeth 49 and 50, preferably constituted of cemented carbide or of a "Stellite" alloy, are mounted in recesses providing abutment surfaces 51 and 52, and a groove 53 for receiving a tongue 54 at the back of a tip. The tips are brazed to the projections 48 at their surfaces of contact therewith. The tips 49 and 50 are mounted on adjacent projections in an alternating sequence around the shell cutter.

The cutting edges of the tips 49 and 50 are so ground as to cut chips of different proportions. FIG. 10 is illustrative of the relative proportions of the top surfaces of the cutting teeth. The outline 49B corresponds to the cutting edges of each tip 49 and the outline 50A corresponds to the cutting edges of each of the tips 50.

As shown in FIG. 11, the nose of each of the tips 50 has a square cutting edge 55 and side cutting edges 56 and 57 which meet with the edge 55 at an angle of about 120°. Suitable cutting clearance angles for the square cutting edge 55, and the side cutting edges 56 and 57 are of the order of approximately 7° and 5°, respectively. All of the tips 50 are set with their square cutting edges 55 disposed in a plane normal to the axis of rotation of the shell cutter and its drive shaft. An element in this plane is indicated at 58.

A tip 49 of the other set of tips 49 is illustrated in FIG. 12. This tip has a cutting nose with a square cutting edge 60 which is shorter than the square cutting edge 55 of the tips 50, and side cutting edges 61 and 62 shaped at an angle of approximately 120° with the edge 60. The cutting clearance angles of the tips 49 are similar to those of the tips 50.

The tips 49 are so mounted on the shell cutter that their square cutting edges 60 also lie in a plane normal to the axis of rotation of the shell cutter but displaced forwardly of the plane indicated by the element 58. An element passing through the plane of the cutting edges 60 is indicated at 63. It is evident that the cutting edges 60 of the set of teeth 49 lead the cutting edges 55 of the set of teeth 50 in the direction of cutting and that chips of different sizes and shapes are removed as the teeth cut through each coil of a wire wrapping. A ratio of approximately 1.75 for the lengths of the square cutting edges 55 and 60 is effective.

A shell cutter suitable for making a 12-inch diameter tap and having six teeth with square cutting edges 1/8 of an inch long, six teeth with square cutting edges 7/32 of an inch long and the teeth with the shorter of the square cutting edge leading the teeth with the longer square cutting edges by 3/64 of an inch operates efficiently to cut the high carbon spring steel wire commonly used in the manufacture of prestressed concrete pipe.

It is to be understood that the foregoing disclosure relates only to preferred embodiments of the invention and that numerous modifications and alterations may be made without departing from the spirit and scope of the invention as set forth in the appended claims.

What is claimed is:

1. In a method for tapping prestressed pipe, said pipe having a tubular body comprising a concrete tube with a tensioned wire wrapping about the tubular body and subjecting the tubular body to compressive strain, and a protective coating covering the outer surface of the tubular body, the combination of steps comprising forming an opening in the protective coating at the location of a proposed tap in the pipe by removing from the coating an area thereof having a perimeter greater than the perimeter of the proposed tap and thereby exposing the exterior surface of the tubular body within the opening and the portions of the wire wrapping extending across the opening, applying a hardenable plastic material onto the exposed surface of the tubular body and thereby encasing the exposed portions of the wire, curing the plastic material to convert it into a hardened coating in bonded relationship to said portions of the wire and exterior surface of the tubular body, and tapping the pipe by cutting a circular kerf through the hardened coating, the encased wire and the tubular body on a circle having a diameter smaller than the minimum diameter of said opening.

2. The method set forth in claim 1 comprising the further step of forming a fluid-tight chamber in sealed relationship to the exterior surface of said hardened coating and subjecting the interior of the chamber to fluid under a pressure substantially equal to the pressure inside of the pipe in advance of cutting through the encased wire.

3. The method set forth in claim 1 wherein the plastic material is extended over the protective coating at and adjacent the edge of the opening for forming a hardened coating of greater expanse than the area of the opening.

4. The method set forth in claim 1 wherein the plastic material is extended only within the area of said opening.

5. In a method for tapping a prestressed pipe under pressure with a cutting machine attached to a tapping assembly including a valve and a saddle on the pipe, said pipe having a tubular body comprising a concrete tube, a tensioned wire wrapping subjecting the tubular body to compressive strain, and a protective coating over the wire and the outer surface of the tubular body, the combination of steps comprising removing from the protective coating an area thereof having a perimeter greater than the perimeter of a proposed tap and thereby uncovering the exterior surface of the tubular body within the opening thus formed in the protective coating and the portions of the wire wrapping extending across the boundary of the opening, forming a sealing film over the uncovered exterior surface of the tubular body and the uncovered portions of the wire wrapping by applying a liquid plastic material thereto, applying a plastic material composition over the sealing film and forming an integrated coating of hardenable material within the area of said opening sufficiently thick to cover said portions of the wire wrapping, said last-applied plastic material composition having a mortar-like consistency, curing the integrated coating of hardenable material, creating a fluid-tight chamber to the outside of the cured coating and interiorly of a tapping assembly on said pipe, filling the fluid-tight chamber with a fluid under pressure substantially equal to the pressure in the pipe, and then cutting through said cured coating, said wire wrapping and said tubular body of the pipe to complete the tap.

6. The method set forth in claim 5 comprising the further step of applying said liquid plastic material to the rim of said protective coating at said opening and onto the exterior surface of said protective coating adjacent the opening.

7. The method set forth in claim 5 is in which said plastic composition comprises thermosetting resin and discrete particles of inert filling material.

References Cited

UNITED STATES PATENTS

| 2,050,985 | 8/1936 | Trickey | 72—42 |
| 2,375,921 | 5/1945 | Hirsh | 29—157 X |
| 2,684,859 | 7/1954 | Longley | 285—199 |
| 3,275,040 | 9/1966 | Hausmann | 138—176 |
| 3,315,989 | 4/1967 | Ohmstad | 29—157 X |

CHARLIE T. MOON, *Primary Examiner.*

LAVERNE D. GEIGER, *Examiner.*

B. KILE *Assistant Examiner.*